United States Patent

[11] 3,542,145

| [72] | Inventor | Robert J. Proffer<br>Flushing, Michigan |
|------|----------|------------------------------------------|
| [21] | Appl. No. | 819,311 |
| [22] | Filed | April 25, 1969 |
| [45] | Patented | Nov. 24, 1970 |
| [73] | Assignee | Rankin Manufacturing, Inc.,<br>Durand, Michigan<br>a corporation of Michigan |

[54] TWO-WHEELED VEHICLE HAVING BALLOON TIRES
17 Claims, 8 Drawing Figs.

[52] U.S. Cl. ............................................. 180/30,
301/5, 280/291, 280/278, 152/9, 152/400, 180/6
[51] Int. Cl. ............................................. B62m 9/00
[50] Field of Search ................................. 180/6, 30,
31, 33, 35, 32; 74/551.1—3; 280/ABR,
287, 291; 152/397, 401

[56] References Cited
UNITED STATES PATENTS

| 1,989,573 | 1/1935 | Loutzkoy | 180/30X |
| 2,768,836 | 10/1956 | Hilber | 74/551.1X |
| 2,970,665 | 1/1961 | Russler | 280/ABR |
| 3,016,967 | 1/1962 | Rehfeld | 180/30 |
| 3,123,168 | 3/1964 | Atwood | 180/27 |
| 3,145,755 | 8/1964 | Turner | 152/401 |
| 3,237,675 | 3/1966 | Fisher | 152/397 |
| 3,268,025 | 8/1966 | Fehn | 180/31 |
| 3,269,480 | 8/1966 | Kirby | 180/35 |
| 3,318,408 | 5/1967 | Hopkins | 180/33 |
| 3,366,193 | 1/1968 | Campbell | 180/32 |

FOREIGN PATENTS

| 228,411 | 2/1925 | Great Britain | 74/551.3 |
| 629,062 | 9/1949 | Great Britain | 280/291 |
| 1,149,612 | 7/1957 | France | 280/287 |

OTHER REFERENCES
American Bicyclist and Motorcyclist Magazine; page 59; October 1962.

Primary Examiner—Kenneth H. Betts
Attorney—Barnard, McGlynn & Reising

ABSTRACT: A two-wheeled vehicle including a frame with a front-steerable balloon-tired wheel mounted on the frame, and a rear balloon-tired wheel mounted on the frame, and means for transmitting drive to the rear wheel for driving the vehicle.

Patented Nov. 24, 1970  3,542,145

INVENTOR.
Robert J. Proffer
BY
Barnard, McGlynn & Reising
ATTORNEYS

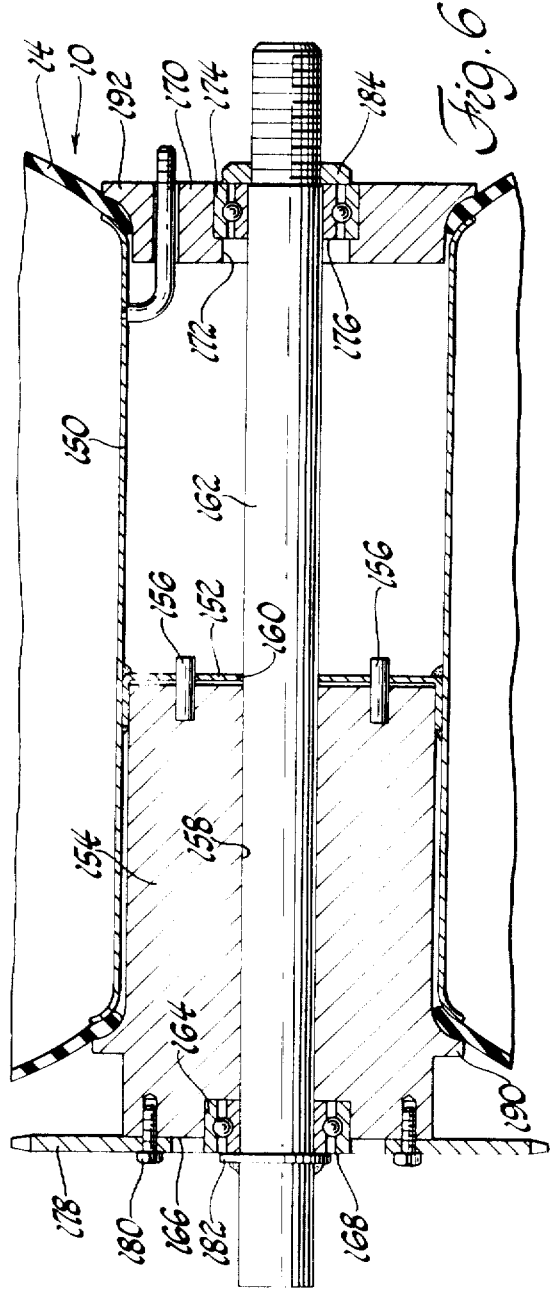
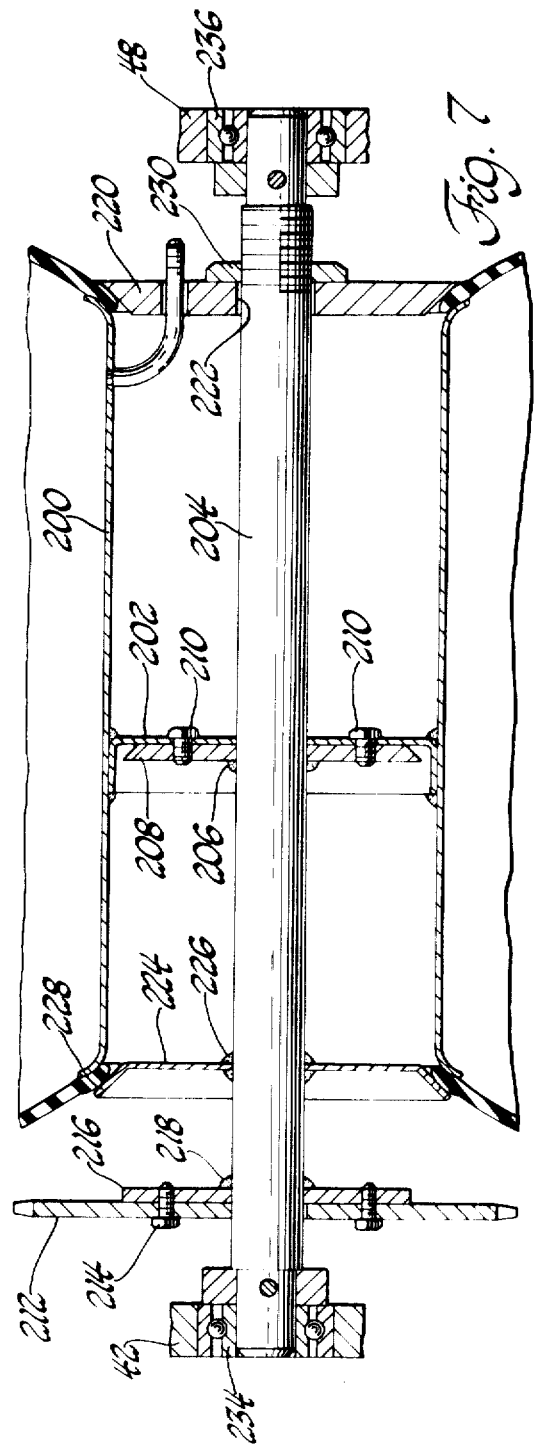

3,542,145

TWO-WHEELED VEHICLE HAVING BALLOON TIRES

This invention relates generally to two-wheeled vehicles of the motorcycle type, and is particularly concerned with a two-wheeled vehicle particularly suitable for use off the road on sand, snow, or in swamps and mud.

While there has been an increasing demand for sporting and utility vehicles for use on sand, snow and in swamps and mud, most attempts at providing a two-wheeled vehicle of the motorcycle type capable of use under such circumstances have met with very limited success. It is difficult to obtain traction with a two-wheeled vehicle having conventional wheels and tires over the wide variety of surface conditions encountered when a vehicle leaves a prepared road surface. It is also extremely difficult to obtain adequate shock absorbence with such vehicles when operating over rough terrain. While tracked vehicles have become increasingly popular for operation in snow, such vehicles are not capable of operating over many other types of surfaces.

It is, therefore, a primary object of this invention to provide a two-wheeled vehicle capable of operating on sand, snow, in swamps and mud, and over rough terrain with adequate traction and shock-absorbing qualities.

A further object is to provide a two-wheeled vehicle having tires capable of conforming readily to irregular surfaces and at the same time, providing a resiliently yieldable support for the vehicle.

In carrying out the foregoing objects, a two-wheeled vehicle according to the present invention is provided with balloon tires. Balloon tires do not get hard as is the case with conventional tires but are characterized by the fact that the pressure in the tire remains substantially constant with the addition of air, the tire merely increasing in size with increased air due to the resiliency of the tire material. Balloon tires can thus readily conform to irregular surfaces and are not limited in their use to smooth, hard surfaces. The tire remains soft and pliable and can provide traction under conditions not suitable for conventional tires such as over snow, sand and muddy or swampy areas.

Most balloon tires are manufactured with a hub in the form of a hollow, cylindrical member for attachment to a drive shaft or axle. It is difficult to provide a driving connection with balloon tires suitable for use in a two-wheeled vehicle.

It is, therefore, among the additional objects of this invention to provide a two-wheeled vehicle having balloon-tired wheels with means for driving the rear, nonsteerable wheel so that the vehicle is capable of use on sand, snow or in swamps and mud.

A further object is to provide a two-wheeled vehicle having a frame with a front-steerable wheel and a rear nonsteerable wheel, both wheels including a hub with a balloon tire mounted thereon and means for transmitting drive to the rear wheel.

A further object is to provide a balloon-tired drive wheel assembly particularly suitable for use with two-wheeled vehicles of the motorcycle type.

A further object is to provide a two-wheeled vehicle capable of recreational and utility use under off-the-road conditions having handlebars and footrests that can be folded to an inoperative position to reduce the size of the vehicle for transport.

The foregoing and other objects are achieved by the provision of a two-wheeled vehicle having a frame with a front-steerable wheel mounted on the frame including a hub with a balloon tire mounted thereon and a rear wheel mounted on the frame also including a hub with a balloon tire mounted thereon. Means is provided for transmitting drive to the rear wheel including a rotatable drive member nonrotatably secured to a transverse connecter in the hollow cylindrical member comprising the hub of the rear wheel. A driven sprocket for the vehicle is nonrotatably secured to the drive member. In one embodiment of the invention, the drive member is in the form of a hollow drive shaft extending through the cylindrical member in coaxial relationship therewith, and a mounting shaft extends through the hollow drive shaft for nonrotatable engagement with the frame. In another embodiment, the drive member comprises a drive cylinder received in the hollow cylindrical member and nonrotatably connected with the transverse connecter plate therein. A mounting shaft is rotatably mounted in the drive cylinder.

In still another embodiment of the invention, the drive member is in the form of a drive shaft extending through the cylindrical hub member in coaxial relationship therewith, and in nonrotatable engagement with a transverse connecter mounted in the cylindrical hub member. The ends of the drive shaft are rotatably supported in the frame. In each of the embodiments, at least one shaft supporting member is mounted in the cylindrical hub member in axially spaced relationship to the transverse connecter mounted therein, and a driven sprocket, pulley or gear is nonrotatably mounted on the drive member.

A vehicle according to the invention may further include a pair of handlebars having a horizontal base portion supported on a mounting plate rotatable about a generally upright steering axis, the base portion of the handlebars being rotatably supported on the mounting plate such that the handlebars are movable between an upright, operative position and a rearwardly folded, inoperative position.

Other objects, advantages and features of the invention will become apparent from the following description taken in connection with the accompanying drawings in which:

FIG. 6 is a view similar to FIG. 3 showing an alternative embodiment; and

FIG. 7 is a view similar to FIGS. 3 and 6 showing still another alternative embodiment of the invention.

Figure 1:
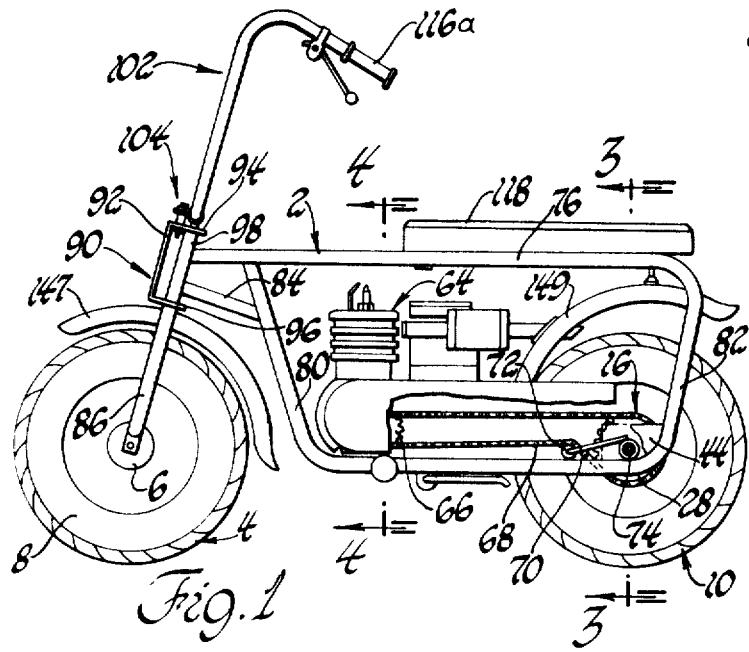
FIG. 1 is a side elevational view of a two-wheeled vehicle embodying the invention.
Figure 2:
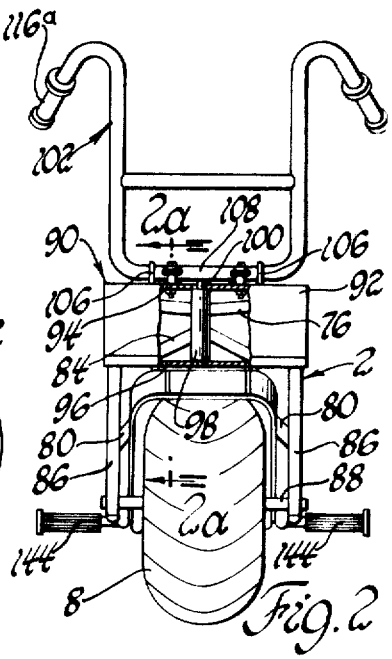
FIG. 2 is a front view of the vehicle of FIG. 1.
Figure 3:
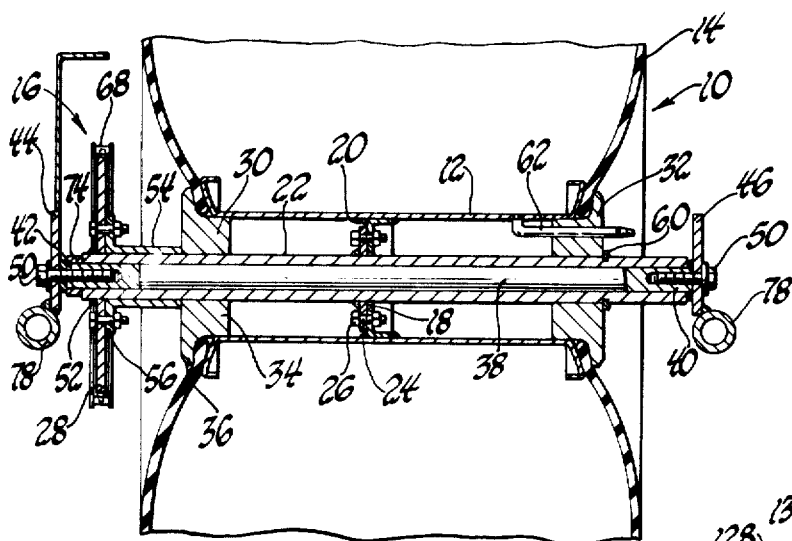
FIG. 3 is a sectional view taken on lines 3–3 of FIG. 1.
Figure 2A:
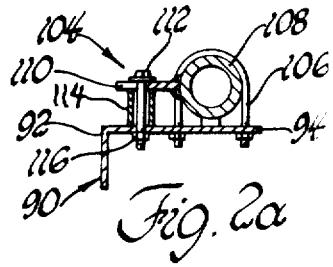
FIG. 2a is a fragmentary detailed view taken on lines 2a–2a of FIG. 2.

FIGS. 1 through 3 illustrate a two-wheeled vehicle having a frame designated generally by reference numeral 2; a front, steerable wheel 4 mounted on frame 2, wheel 4 including a hub 6 with a balloon tire 8 mounted thereon. A rear wheel 10 is mounted on frame 2 and includes a hub 12 (FIG. 3) with a balloon tire 14 molded or otherwise mounted on hub 12. The vehicle further includes means designated generally by reference numeral 16 for transmitting drive to the rear wheel 10.

The rear wheel hub is in the form of a hollow, cylindrical member 12 as shown in FIG. 3 and includes a transverse connecter plate 18 mounted therein and secured to the inner wall thereof by welding as indicated at 20. The means 16 for transmitting drive to the rear wheel includes a rotatable drive member 22 nonrotatably secured to the transverse connecter 18 by a plate 24 welded to the drive member 22 and secured to the connecter 18 by conventional fasteners 26. The means 16 for transmitting drive to the rear wheel 10 further includes a driven sprocket 28 or other torque-transmitting member such as a gear or pulley, which is nonrotatably secured to the drive member 22. The drive member 22 as shown in FIG. 3 comprises a drive shaft extending through the cylindrical member 12 in coaxial relationship therewith. The drive shaft, as mentioned previously, is welded to the plate 24 which in turn is nonrotatably secured to the connecter 18.

The embodiment of FIG. 3 includes a pair of shaft-supporting members 30 and 32, one of which is mounted in one end of the cylindrical member 12 and the other of which is mounted in the other end of the cylindrical member 12, the drive shaft 22 being supported in the shaft-supporting members 30 and 32. The shaft-supporting member 30 includes a cylindrical body 34, which is received in the cylindrical member 12, and a radially-projecting flange 36 which engages the inner periphery of the balloon tire 14. The shaft-supporting member 32 is of similar construction. The drive shaft 22 in FIG. 2 is hollow, and a mounting shaft 38 is rotatably received in the drive shaft 22 with its ends 40 and 42 projecting from the drive shaft and secured to support plates 44 and 46, respectively, of the frame. As shown in FIG. 3, the ends 40 and 42 of the mounting shaft 38 are provided with threaded holes for receiving bolts 50 to secure the mounting shaft between the frame members 44 and 46.

Sprocket 28 is secured to drive shaft 22 against axial movement with respect thereto by conventional means such as welding as indicated at 52, and a cylindrical spacer member 54 is received between sprocket 28 and the adjacent shaft-supporting member 30. Spacer member 54 is formed with a radial flange 56 on one end thereof which is bolted to sprocket 28. A detachable stop member 60 in the form of a spring clip received in an annular groove formed in the drive shaft 22 engages the outer face of the opposite shaft-supporting member 32 to cooperate with the spacer 54 to clamp the flanges 36 of the shaft-supporting members against the inner periphery of the tire and the ends of the cylindrical hub member 12 as well as to prevent axial displacement of the drive shaft 22 relative to the shaft-supporting members 30 and 32. The shaft-supporting member 32 is provided with an opening for receiving a conduit 62 having a conventional tire valve therein for inflating the balloon tire 14.

The vehicle of FIGS. 1 through 3 further includes an engine 64 of conventional construction mounted on the frame in a conventional manner with a driving sprocket 66, or other torque-transmitting member such as a gear or pulley, mounted on the output shaft of the engine. The driving sprocket 66 has a diameter less than the diameter of the driven sprocket 28, and a drive chain 68 drivingly connects the driving and driven sprockets. Projecting forwardly from the mounting shaft 38 is an idler arm 70 with an idler roller 72 mounted on the outer end thereof and engaging the lower run of the chain 68 to maintain the proper tension on the chain and to prevent the chain from being disengaged from the sprocket 28 by lateral expansion of the balloon tire 14 under shock loads. The idler arm 70 is mounted on a cylindrical collar 74 which in turn is adjustably, nonrotatably secured to the mounting shaft 38 by a setscrew or the like (not shown).

The frame 2 includes side frame portions each having an upper frame member 76, a lower frame member 78, a front frame member 80 and a rear frame member 82. The mounting plates 44 and 46 are welded or otherwise secured to the lower frame members 78 and rear frame members 82. Bracing frame members 84 project forwardly from the front frame members 80 near the upper ends thereof but are spaced below the upper frame members 76. Engine 64 causes the driving sprocket 66 to rotate which, in turn, drives sprocket 28 through chain 68. Sprocket 28 is nonrotatably secured to shaft 22 which, in turn, is nonrotatably secured to the transverse connecter 18 to transmit drive through the cylindrical hub member 12 to the balloon-tired wheel 10 for driving the vehicle. Shaft 22 rotates on the mounting shaft 38 which is nonrotatably secured to the plates 44 and 46 projecting upwardly from the lower frame members 78 and forwardly from the rear frame members 82.

The vehicle of FIGS. 1 and 2 has a pair of front-wheel-supporting arms 86, the front wheel 4 being rotatably mounted between the lower ends of arms 86 on a shaft 88. Mounting means designated generally by reference numeral 90 supports the arms 86 on the frame 2 for pivotal movement about a generally upright steering axis. The mounting means 90 includes a mounting plate 92 having spaced upper and lower rearwardly projecting flanges 94 and 96, respectively, and a steering post 98 is received between flanges 94 and 96 and pivotally connected therewith by pins 100. Handlebars 102 are mounted on the upper flange 94 for selective movement between an upright steering position and a rearwardly projecting or folded storage position. Interengageable locking elements designated generally by reference numeral 104 on the mounting plate 92 and handlebars 102 are operable to selectively lock the handlebars 102 against movement from its upright position. A pair of spaced eyebolts 106 are mounted on the upper flange 94, and the handlebars 102 are provided with a horizontal base portion 108 (FIG. 2) rotatably received in the eyebolts 106.

The interengageable locking elements 104 comprise a pair of slotted plates 110 each projecting outwardly from the base member 108 of the handlebars 102, and an associated hollow sleeve or spacer mounted on the upper flange 94. A locking bolt 112 is received in the hollow sleeve or spacer 114 and is receivable in the slot of the plate 110. A nut 116 is threadedly adjustably mounted on bolt 112, and a washer beneath the head of bolt 112 engages the upper surface of the locking plate 110 on each side of the slot to prevent rearward pivotal movement of the handlebars. The upper end of sleeve 114 is engageable with the lower surface of the locking plate to prevent forward pivotal movement of the handlebars from the upright position. By loosening the locking nut 116, the slotted plate 110 can be released from the upright bolt 112 to permit the handlebars 102 to be folded rearwardly such that the handgrip portions 116a are received on each side of the seat 118 mounted on the upper frame members 76.

Figure 5:
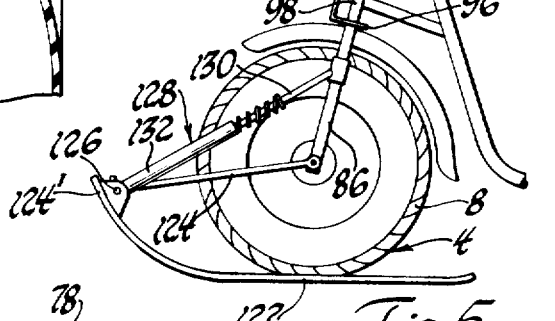
FIG. 5 is a partial elevational view illustrating a ski attachment suitable for a vehicle according to the invention.

FIG. 5 illustrates a snow ski 122 secured to the front wheel 4 such that the balloon tire 8 provides a yieldable support for the ski. A forwardly projecting supporting rod 124 has one end pivotally mounted on one end of shaft 88 at the lower end of one of the arms 86, and the ski 122 has an upturned end 124' which is pivotally mounted at 126 on the outer end of the supporting rod 124, the ski projecting rearwardly beneath the balloon tire 8. A resiliently telescopic shock absorber 128 has one end of one telescopic member 130 secured to one of the wheel support arms 86 and its other end of the other telescopic member 132 pivotally secured with the upturned end of the ski 122 at 126.

Figure 4:
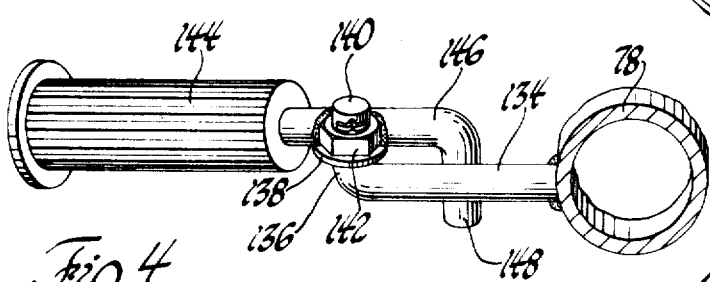
FIG. 4 is a detailed view of a foldable footrest taken on lines 4–4 of FIG. 1.

FIG. 4 illustrates the details of a footrest assembly which includes a footrest-supporting rod 134 which is mounted on the side of the frame 2 and projects outwardly from frame member 78. The footrest-supporting rod 134 has an upturned end portion 136 with a flange 138 on the upturned end portion 136 spaced from the end 140 thereof. A collar member 142 is rotatably mounted on the upturned end portion 136 above flange 138, and a footrest member 144 with an inwardly extending mounting rod 146 is welded or otherwise secured to the collar 142 and is provided with a downturned inner end portion 148 which is engageable with the footrest-supporting rod 134 to limit pivotal movement of the footrest 144 in one direction about the footrest-supporting rod 134. Consequently, for storage and transport, the footrest 144 can be rotated about the upturned end portion 136 to lie alongside the supporting frame 2 instead of projecting laterally outwardly therefrom as illustrated, for example, in FIG. 2.

Front and rear fenders 147 and 149, respectively, are secured to frame 2 in a conventional manner to respectively overlie the front and rear wheels 8 and 10.

FIG. 6 illustrates a modification of the drive connection for the rear wheel 10 of the vehicle of FIG. 1. As illustrated in FIG. 6, the rear wheel hub comprises a hollow cylindrical member 150 with a transverse connecter 152 mounted therein and secured to the inner wall thereof by welding or other conventional means. Means for transmitting drive to the rear wheel of FIG. 6 includes a rotatable drive member 154 in the form of a drive cylinder 154 which is received in the cylindrical member 150 and is drivingly connected with the connecter plate 152 by drive pins 156 to prevent relative rotation between the drive cylinder 154 and the cylindrical member 150. The drive cylinder 154 has an axial passage 158 defined therein which is coaxial with an opening 160 in the connecter plate 152. A mounting shaft 162 is rotatably mounted in the axial passage 58 and projects outwardly from the cylindrical member 150. A bearing recess 164 is formed in the outer surface 166 of the drive cylinder 154 and surrounds the axial passage 158. Mounted in the bearing recess 164 is a bearing assembly 168 for rotatably supporting the drive cylinder 154 on the mounting shaft 162. A shaft-supporting member 170 is mounted in the end of the cylindrical member 150 opposite the drive cylinder 154 and is formed with an axial opening 172. A bearing recess 174 is formed in the outer face of the shaft-supporting member 170 and surrounds the axial opening 172. Received in the bearing recess 174 is a bearing assembly 176 for rotatably supporting the shaft-supporting member 170 on the mounting shaft 162. Nonrotatably secured to the outer face 166 of the drive cylinder 154 by bolts 180 is a driven sprocket 178. Welded or otherwise fixedly secured to the mounting shaft 162 is a collar 182 which engages the bearing assembly 168 and cooperates with an adjustable stop member 184 threadedly mounted on the opposite end of the mounting shaft 162 to secure the bearing assemblies in their respective recesses as well as to secure the flanges 190 and 192 of the drive cylinder 154 and shaft-supporting member 170, respectively, into clamping engagement with the inner diameter of the balloon tire 14.

Thus, in the FIG. 6 embodiment, the drive is transmitted from the driving sprocket 66 of FIG. 1 to the driven sprocket 178 which, in turn, causes the drive cylinder 154 to rotate on the mounting shaft 162 which has its ends fixedly mounted on the vehicle frame.

In the embodiment of FIG. 7, the rear wheel hub comprises a hollow cylindrical member 200 with a transverse connecter plate 202 mounted therein and secured to the inner wall thereof by welding. Means for transmitting drive to the rear wheel in the FIG. 7 embodiment includes a rotatable drive member 204 nonrotatably secured by welding at 206 to a plate 208 which, in turn, is secured by bolts 210 to the transverse connecter 202. A driven sprocket 212 is secured by bolts 214 to a plate 216 nonrotatably secured by welding at 218 to the drive shaft 204. Mounted in one end of the cylindrical member 200 is a shaft-supporting member 220 with an axial opening 222 formed therein receiving the drive shaft 204. A stop flange is defined on the drive shaft 204 by a plate member 224 welded as at 226 to the shaft 204 with its outer periphery at 228 engaged with the inner rim of the tire mounted on the cylindrical member 200. Threadedly mounted on the shaft 204 is a stop member 230 for engaging the outer face of the shaft-supporting member 220. The adjustable stop member 230 cooperates with the stop flange 224 to maintain the parts in assembled relationship and to prevent axial displacement of the shaft-supporting member 220. Bearing assemblies 234 and 236 are mounted in the supporting plates 42 and 48, respectively, on the frame of the vehicle for receiving the ends of the drive shaft 204. Collars are mounted on the reduced ends, respectively, of drive shaft 204 by pins to prevent axial displacement of the shaft relative to support plates 42 and 48.

In the embodiment of FIG. 7, rotation of the driven sprocket 212 by the vehicle engine through the drive chain causes rotation of shaft 204 and of the cylindrical member 200 and the tire mounted thereon in the bearing assemblies 234 and 236 mounted in the frame plates to drive the vehicle.

Thus, FIG. 3 shows a drive wheel assembly comprising a hollow cylindrical hub member 12 with a transverse connecter 18 mounted therein and secured to the inner wall thereof with a drive member 22 nonrotatably secured to the transverse connecter 18. Mounting means 38 projects from opposite ends of the hollow cylindrical hub member 12 in coaxial relationship therewith, the mounting means being adapted to support hub member 12 between a pair of supporting members 44 and 46.

The drive member 22 comprises a hollow drive shaft, and the mounting means comprises a mounting shaft 38 rotatably received in the hollow drive shaft 22. A pair of shaft-supporting members 30 and 32 are mounted in opposite ends of the cylindrical hub member 12, the shaft-supporting members each having a cylindrical body portion 34 received in the cylindrical hub member and having an axial opening receiving said hollow drive shaft 22. Each of the shaft-supporting members 30 and 32 has a radially projecting flange 36 projecting over the associated end of the cylindrical hub member 12. The construction illustrated in FIG. 3 further includes means 54 and 60 fixed on the hollow drive shaft and engaging the outer faces of the shaft-supporting members 30 and 32 to secure the hollow drive shaft 22, cylindrical hub member 12, and shaft-supporting members 30 and 32 in assembled relationship.

FIG. 6 illustrates a drive wheel assembly comprising a hollow cylindrical hub member 150 with a transverse connecter 152 mounted therein and secured to the inner wall thereof with a drive member 154 nonrotatably secured to the transverse connecter 152, and mounting means 162 projecting from opposite ends of said hollow cylindrical hub member 150 in coaxial relationship therewith adapted to support the hub member between a pair of supporting members. The drive member comprises a drive cylinder 154 received in the cylindrical member 150 and nonrotatably secured by pins 156 to the transverse connecter 152. The drive cylinder 154 has an axial passage 158 formed therein, and the mounting means comprises a mounting shaft 162 rotatably received in the axial passage 158. A bearing recess 164 is formed in the end face 166 of the drive cylinder 154 opposite the transverse connecter 152, and a bearing assembly 168 is mounted in recess 164 with the mounting shaft 162 being supported in the bearing assembly 168. A shaft-supporting member 170 is mounted in the end of said hub member 150 opposite the drive cylinder 154, the shaft-supporting member 170 having an axial opening 172 formed therein. A bearing recess 174 is formed in the outer face of the shaft-supporting member 170 and a second bearing assembly 176 is mounted in the bearing recess 174 with the mounting shaft 162 being received in the axial opening 172 of shaft-supporting member 170 and supported in the second bearing assembly 176. The FIG. 6 construction further includes means 182 and 184 mounted on mounting shaft 162 engaging the outer surfaces of said bearing assemblies for maintaining the bearing assemblies 168 and 176, drive cylinder 154, shaft-supporting member 170, mounting shaft 162, and cylindrical hub 150 in assembled relationship.

FIG. 7 illustrates a drive wheel assembly comprising a hollow cylindrical hub member 200 with a transverse connecter 202 mounted therein and secured to the inner wall thereof with a drive member 204 nonrotatably secured to the transverse connecter 202 by plate 208, bolts 210 and welding 206. Mounting means 242 and 244 projects from opposite ends of the hollow cylindrical hub member 200 in coaxial relationship therewith, which mounting means is adapted to support the hub member 200 between a pair of supporting members 42 and 48. The drive member comprises a drive shaft 204 and the mounting means comprises the ends 242 and 244 of the drive shaft 204. The FIG. 7 embodiment further includes a shaft-supporting member 220 mounted in one end of the cylindrical hub 200 and engaging the outer end thereof, the shaft-supporting member having an axial opening 222 receiving the drive shaft 204. Means 230 mounted on the drive shaft 204 engages the outer face of the shaft-supporting member 220 to maintain the drive shaft 204, shaft-supporting member 220, and cylindrical hub member 200 in assembled relationship. The FIG. 7 embodiment further includes a flange 224 mounted on shaft 204 and projecting radially outwardly therefrom to overlie the end of the cylindrical hub member 200, flange 224 being axially secured to shaft 204 be welding 226.

While several specific embodiments of the invention have been described in the foregoing specification and illustrated in the accompanying drawings, it will be apparent to those skilled in the art that various alterations in the construction and arrangement of parts can be made by those skilled in the art without departing from the scope and spirit of the invention.

I claim:

1. A two-wheeled vehicle comprising: a frame; a front-steerable wheel mounted on said frame including a hub with a balloon tire mounted thereon; a rear wheel mounted on said frame including a hub with a balloon tire mounted thereon; means for transmitting drive to said rear wheel; said rear wheel hub comprising a hollow cylindrical member with a transverse connecter mounted therein and secured to the inner wall thereof; said means for transmitting drive to said rear wheel including a rotatable drive member nonrotatably secured to said transverse connecter and a driven torque-transmitting member nonrotatably secured to said drive member; said drive member comprising a drive shaft extending through said cylindrical member in coaxial relationship therewith; at least one shaft-supporting member mounted in said cylindrical member in axially spaced relationship to said transverse connecter for supporting said drive shaft; said drive shaft being hollow; and further including a mounting shaft rotatably received in said drive shaft with its ends projecting from said drive shaft and secured to said frame.

2. A two-wheeled vehicle as claimed in claim 1 wherein said torque-transmitting member comprises a sprocket secured to said drive shaft against axial movement with respect thereto, and further including a cylindrical spacer member received between said sprocket and the adjacent shaft-supporting member, and a detachable stop member on said drive shaft engaging the outer face of the opposite shaft-supporting member to prevent axial displacement of said drive shaft relative to the shaft-supporting member.

3. A two-wheeled vehicle as claimed in claim 2 further including an engine mounted on said frame, a driving sprocket mounted on the output shaft of said engine having a diameter less than the diameter of said driven sprocket, a drive chain connecting said driving and driven sprockets, and an idler arm projecting forwardly from said mounting shaft with an idler roller mounted on the outer end thereof and engaging the lower run of said chain.

4. A two-wheeled vehicle as claimed in claim 3 including a pair of shaft-supporting members, one of which is mounted in one end of said cylindrical member and the other of which is mounted in the other end of said cylindrical member.

5. A two-wheeled vehicle comprising: a frame; a front-steerable wheel mounted on said frame including a hub with a balloon tire mounted thereon; a rear wheel mounted on said frame including a hub with a balloon tire mounted thereon; means for transmitting drive to said rear wheel; a pair of front-wheel-supporting arms, said front wheel being rotatably mounted between the lower ends of said arms: a mounting plate supporting said arms on said frame for pivotal movement about a generally upright steering axis; said mounting plate having spaced upper and lower rearwardly projecting flanges; a steering post on said frame received between said flanges and pivotally connected therewith; handlebars mounted on the upper flange of said plate for selective movement between an upright-steering position and a rearwardly projecting folded storage position; and interengageable locking elements on said mounting plate and said handlebars for selectively locking said handlebars against movement from said steering position.

6. A two-wheeled vehicle as claimed in claim 5 wherein said handlebars have a horizontal base portion, and further including handlebar support means rotatably receiving said base portion.

7. A two-wheeled vehicle as claimed in claim 6 wherein said interengageable locking elements comprise at least one plate projecting outwardly from the base member of said handlebars with a slot defined therein, a hollow sleeve mounted on said upper flange, a locking bolt received in said sleeve and receivable in said slot, a washer between the head of said locking bolt and said plate for engaging the upper surface of said locking plate on each side of said slot to prevent rearward pivotal movement of said handlebars, and said sleeve defining a stop member engageable with the lower surface of said locking plate to prevent forward pivotal movement of said handlebars from the upright position.

8. A two-wheeled vehicle comprising: a frame; a front-steerable wheel mounted on said frame including a hub with a balloon tire mounted thereon; a rear wheel mounted on said frame including a hub with a balloon tire mounted thereon; and means for transmitting drive to said rear wheel; a footrest-supporting rod mounted on each side of said frame and projecting outwardly therefrom, and having an upturned end portion; a flange on said upturned end portion spaced from the end thereof; a collar member rotatably mounted on said upturned end portion above said flange; and a footrest having an inwardly extending mounting rod secured to said collar with a downturned inner end portion engageable with said footrest-supporting rod to limit pivotal movement of said footrest in one direction about said footrest-supporting rod.

9. A two-wheeled vehicle comprising: a frame having spaced side frame portions; front-wheel-supporting means mounted on said frame for pivotal movement about a steering axis; a front wheel including a hub with a balloon tire mounted thereon; said front wheel being rotatably mounted on said front-wheel-mounting means; rear-wheel-mounting means secured to said side frame portions; a drive member rotatably supported by said mounting means; a rear wheel received between said side frame portions and including a cylindrical hub with a balloon tire mounted thereon; said cylindrical hub coaxially receiving said drive member; means securing said drive member against rotation with respect to said cylindrical hub member such that rotation of said drive member causes rotation of said rear wheel; a driven torque-transmitting member nonrotatably mounted on said drive member externally of said cylindrical hub member; an engine mounted on said frame; and a driving torque-transmitting member mounted on the output shaft of the engine and drivingly engaged with said driven torque-transmitting member.

10. A two-wheeled vehicle comprising: a frame having spaced side frame portions; front-wheel-supporting means mounted on said frame for pivotal movement about a steering axis; a front wheel including a hub with a balloon tire mounted thereon, said front wheel being rotatably mounted on said front-wheel-mounting means; a rear wheel including a cylindrical hub with a balloon tire thereon, said rear wheel being received between said side frame portions; a drive member mounted in said cylindrical hub member; means securing said drive member against rotation relative to said cylindrical hub member; said drive member being hollow to define an axial passage extending therethrough; a mounting shaft rotatably received in said passage with its ends projecting from said hub and secured to opposite sides of said frame for rotatably supporting said rear wheel on said frame; a driven torque-transmitting member nonrotatably mounted on said drive member externally of said hub member; an engine mounted on said frame; and a driving torque-transmitting member mounted on the output shaft of said engine and drivingly engaged with said driven torque-transmitting member.

11. A two-wheeled vehicle as claimed in claim 9 wherein said drive member is hollow and said mounting means comprises a mounting shaft rotatably received in said drive member.

12. A two-wheeled vehicle as claimed in claim 11 wherein said drive member extends through said cylindrical hub with its ends projecting from the ends of said cylindrical hub.

13. A two-wheeled vehicle as claimed in claim 11 wherein said drive member comprises a drive cylinder having a length less than the length of said cylindrical hub.

14. A two-wheeled vehicle as claimed in claim 13 wherein said means securing said drive member against rotation with respect to said cylindrical hub member comprises a transverse connecter and at least one pin member nonrotatably securing said drive cylinder to said transverse connecter.

15. A two-wheeled vehicle as claimed in claim 14 including a bearing recess formed in the end of said drive cylinder opposite said transverse connecter, and a bearing assembly mounted in said bearing recess, said mounting shaft being supported in said bearing assembly.

16. A two-wheeled vehicle as claimed in claim 15 wherein said drive cylinder has a portion that projects from one end of said cylindrical hub member for supporting said driven torque-transmitting member; and a radially outwardly extending flange is formed on said portion.

17. A two-wheeled vehicle as claimed in claim 9 wherein said drive member comprises a shaft extending coaxially through said cylindrical hub; said rear-wheel-mounting means comprising a bearing assembly in each of said side frame portions with the ends of said shaft rotatably mounted in said bearing assemblies.